July 6, 1965   J. G. TYHURST   3,192,941
APPARATUS COMPRISING A DEVICE FOR BLENDING AND APPLYING
RESINS TO A SURFACE WITH SOLVENT CLEANING MEANS
Filed Feb. 7, 1962   2 Sheets-Sheet 1
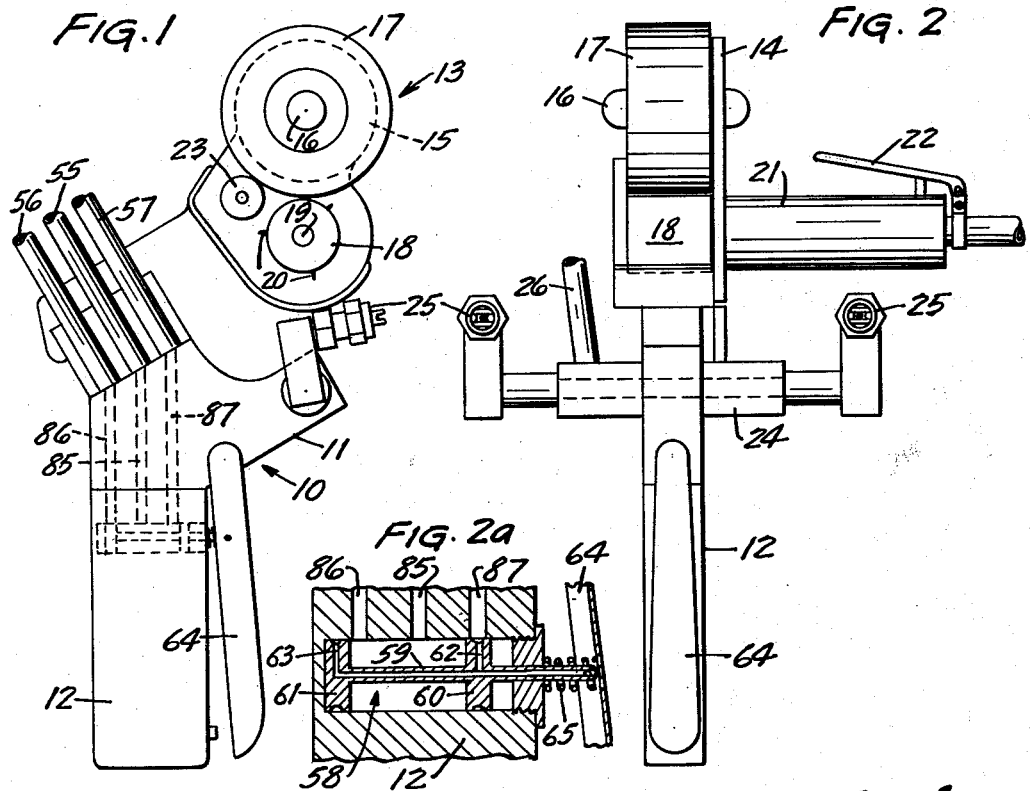
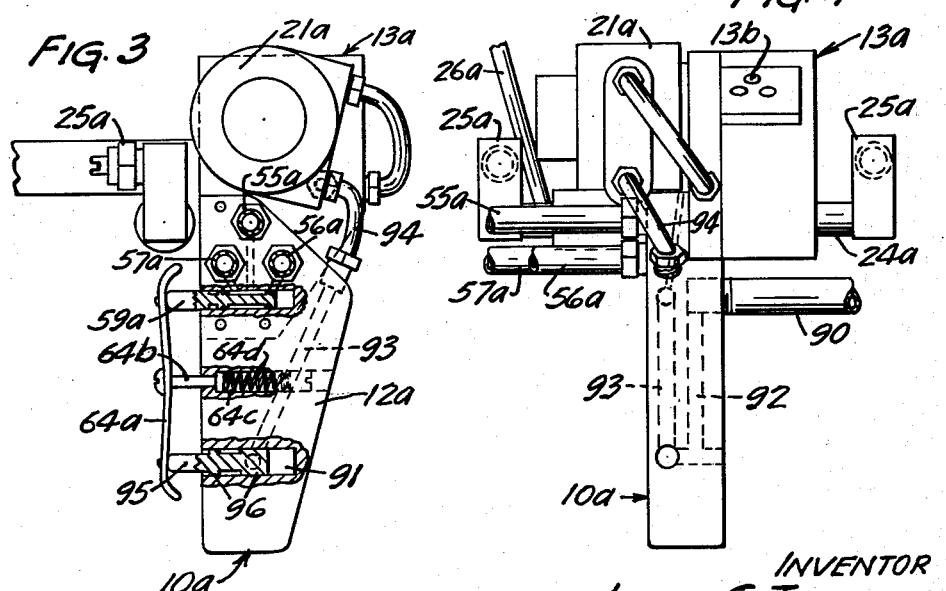
INVENTOR
JAMES G. TYHURST
BY Williamson & Palmatier
ATTORNEYS

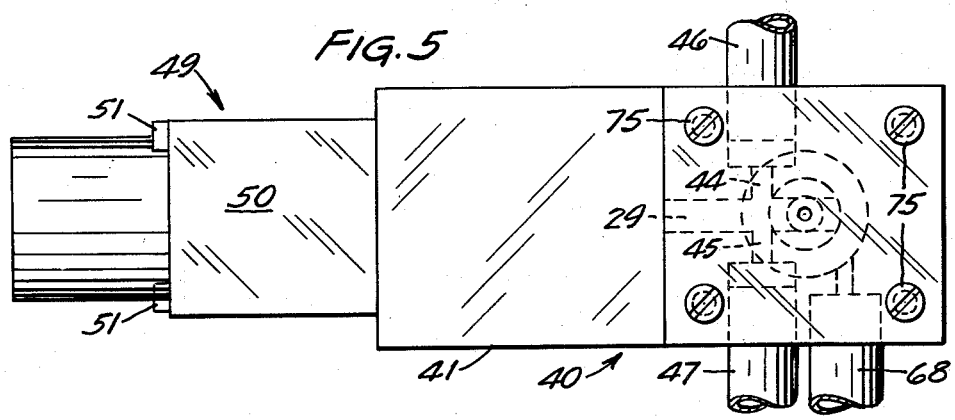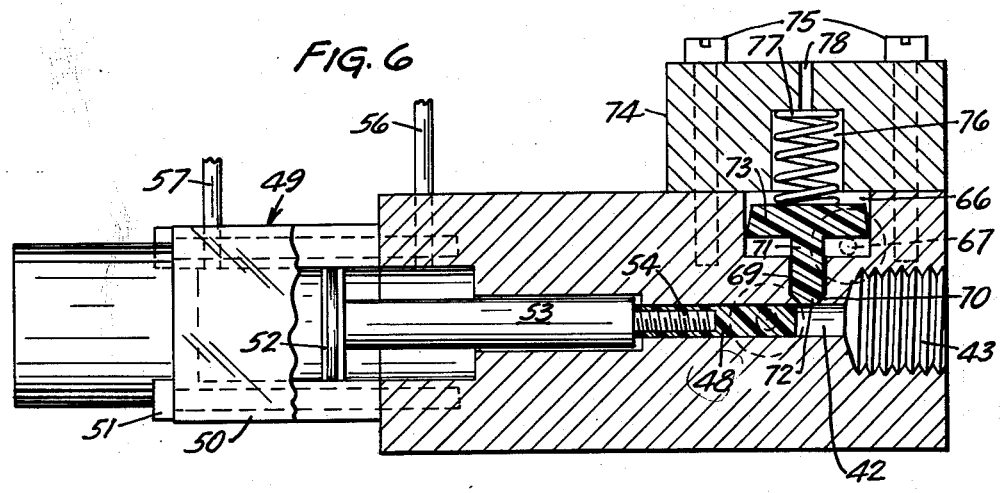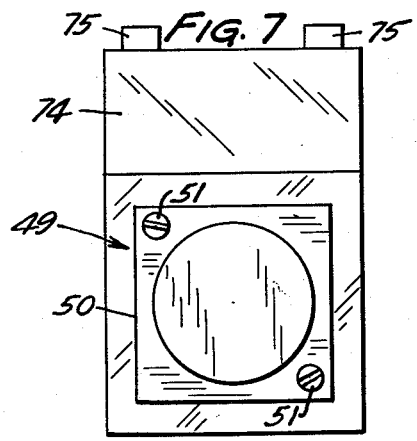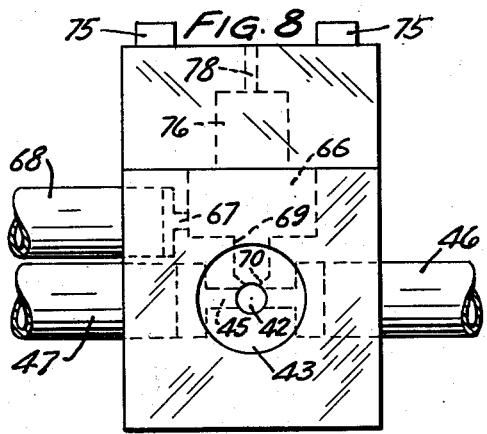

United States Patent Office 3,192,941
Patented July 6, 1965

3,192,941
APPARATUS COMPRISING A DEVICE FOR BLENDING AND APPLYING RESINS TO A SURFACE WITH SOLVENT CLEANING MEANS
James G. Tyhurst, Minneapolis, Minn., assignor to Polystructures, Incorporated, Minneapolis, Minn., a corporation of Minnesota
Filed Feb. 7, 1962, Ser. No. 171,675
4 Claims. (Cl. 137—240)

This invention relates to apparatus for metering and blending components of thermo-setting resin systems and for applying the thermo-setting resin system to a surface.

An object of this invention is to provide a novel apparatus, of simple and inexpensive construction, for very efficiently applying fiber-reinforced resins to a surface.

Another object of this invention to to provide a novel and improved applicator gun for effectively applying fiber-reinforced thermo setting resin systems to a surface and including a plurality of resins dispensing nozzles arranged and constructed for completely coating the reinforcing fibers during the dispensing operation, and valve means for metering and blending the components of the thermo setting resin system prior to delivery of the resins to the dispensing nozzles.

Another object of this invention is to provide a novel and improved valve apparatus for use in metering and blending two or more liquid components of thermo-setting resin systems including a mixing chamber in which the various components of a thermo-setting resin system are blended, and means for flushing and removing the residual traces of the thermo-setting resin from the mixing chamber at the end of the blending and metering operation.

These and other objects and advantages of the invention will more fully appear from the following description made in connection with the accompanying drawings wherein like character references refer to the same or similar parts throughout the various views and in which:

FIG. 1 is a side elevational view of one embodiment of the applicator gun;

FIG. 2 is a front elevational view of the applicator gun illustrated in FIG. 1;

FIG. 2a is a cross-sectional view through a valving arrangement included in the applicator gun;

FIG. 3 is a side elevational view of a modified form of the novel applicator gun;

FIG. 4 is a rear elevational view of the embodiment illustrated in FIG. 3;

FIG. 5 is a top plan view of a novel blending and metering valve apparatus which is advantageously employed in this applicating system;

FIG. 6 is a side view partly in section and partly in elevation of the valve apparatus illustrated in FIG. 5 and with certain parts thereof illustrated in dotted line configuration;

FIG. 7 is a rear elevational view of the valve apparatus illustrated in FIG. 5; and FIG. 8 is a front end elevational view.

Referring now to the drawings and more specifically to FIGS. 1 and 2, it will be seen that one embodiment of the novel applicator gun apparatus, designated in its entirety by the reference numeral 10, is thereshown. The novel applicator gun apparatus 10 is of the type used in the application of fiber reinforced thermo-setting resins systems to surfaces. It is preferred that a polyester or epoxy thermo-setting resin system be used although other thermo-setting resin systems may be used and it is also preferred that the reinforcing material be chopped Fiberglas.

Referring again to FIGS. 1 and 2, it will be seen that the gun apparatus 10 includes a gun body 11 having a pistol grip handle 12 to be gripped by the user. A chopper and dispensing mechanism 13 for use in chopping and dispensing Fiberglas and the like is mounted on the gun body 11 and includes a mounting bracket 14. A relatively large compression roller 15 is mounted for rotation relative to the bracket 14 by means of an axle or axis pin 16. This relatively large compression roller 15 is provided with a covering or sleeve 17 formed of a compressible material such as rubber or the like.

The chopper mechanism 13 also includes a cutter roller 18 having a pin or shaft 19 and mounted for rotation relative to the bracket 14. It will be noted that the cutter roller 18 has its outer circumferential surface disposed in tangential contact with the outer surface of roller 15. It will also be noted that the cutter roller 18 is provided with a plurality of cutter elements or blades 20 which are affixed thereto and which project outwardly therefrom. Means are provided for drivingly revolving the cutter roller 18 and this means includes an air motor 21 suitably connected by an air conduit to a source of air under pressure. An actuating lever 22 is provided for actuating air motor 21 to thereby drive the cutter roller 18. An idler or guide roller 23 is mounted rearwardly of the driven cutter roller 18 but below the large compression roller 15. It will be noted that the idler or guide roller 23 is disposed in tangential contact with the large roller 15 and that the latter cooperates with the cutter roller to simultaneously chop a plurality of strands of Fiberglas which will be pulled between the respective compression and cutter rollers. It will be appreciated that inasmuch as the compression roller 15 and the cutter roller 18 have their respective circumferential surfaces disposed in tangential relationship and because of the inherent resiliency of the compression roller 15, that the blades 20 will penetrate the compression roller, thus not only effecting a cutting action but pulling action on strands of fiber which will be interposed between respective rollers.

Means are also provided for dispensing the liquid thermo-setting resins in the form of a spray, this liquid resin dispensing means being arranged and constructed to simultaneously completely coat the chopped reinforcing fibers during application of the resins. This resin dispensing means includes an elongate resin-receiving member 24 mounted on the gun body 11 in transversely extending relationship and projecting laterally outwardly from opposite sides thereof.

It will be noted that this elongate resin dispensing member 24 is of tubular construction and is positioned below the chopper and dispensing mechanism 13. A pair of nozzle units 25 are affixed to the elongate resin receiving member 24, one being located at each end of the member 24 and these nozzle units are of conventional construction and serve to eject or dispense the liquid resin in a spray. It will be noted that the nozzle units are arranged in slightly converging relation with respect to each other so that the sprays ejected by the respective nozzles 25 will converge forwardly of the applicator gun apparatus. The resin dispensing member 24 is connected in communicating relation to a resin supply conduit 26, the latter being interconnected to a suitable source of a thermo-setting resin system. It will be noted that the use of a pair of nozzles arranged in slightly converging relationship permit the chopped fibers to be completely and effectively coated by the thermo-setting resin thereby permitting the construction of highly efficient, fiber reinforced structural shapes.

Means are also provided for blending and metering the various components of the thermo-setting resin system prior to the ejection or dispensing of the liquid resin by the applicator gun apparatus 10. This means for pre-mixing the components of the thermo-setting resin system comprises a blending and metering valve apparatus 40 which is interposed in flow-controlling relation between the respective sources of the various components of the thermo-setting resin system and the applicator gun apparatus 10. Referring now to FIGS. 5 to 8, it will be seen that the blending and metering valve apparatus 40 includes a valve housing structure 41 having a recess therein defining a mixing and blending chamber 42. The valve housing structure 41 also includes a discharge port 43 which is provided with suitable threads for connection to the supply conduit 26.

The valve housing structure 41 is also provided with a pair of inlet ports 44 and 45 respectively which are arranged in diametrically opposed relationship. It will be noted that the inlet port 44 is connected in communicating relation with the conduit 46, this conduit being connected to a supply of one of the components of the thermo-setting resin system while the inlet port 45 is connected to a conduit 47, the latter being connected to another of the components of the thermo-setting resin system. It is pointed out that in the event that the thermo-resin systems comprise a polyester resin system, one of the conduits will be connected to a supply of a promoted resin while the other of the conduits may be connected to a supply of a catalyzed resin.

Inasmuch as the inlet ports 44 and 45, respectively, are disposed substantially in a common vertical plane, a single valve element is employed for opening and closing these ports. This valve element designated by the reference numeral 48 is disposed within the mixing or blending chamber 42 for extensible and retractable movement relative thereto. Actually, this valve element is formed of Teflon and has a cross sectional size slightly larger than the cross sectional size of the blending chamber. With this arrangement, when the valve element 48 is extended into the blending chamber 42, the valve element will be moved to sealingly close the ports 44 and 45. When the valve element is retracted, however, the ports 44 and 45 will be opened thereby permitting the liquid resin components to be mixed or blended within the blending chamber 42. Because of the over size of the valve element 48, and because of the inherent compressibility and resiliency of the Teflon material a complete seal is obtained with regard to the ports 44 and 45 when the valve element is closed. It also pointed out that the resin components of the blended resin will not adhere to the Teflon valve element.

Means are provided for shifting the valve element 48 to open and close the inlet ports and this valve shifting means comprises a pneumatic ram 49 including a pneumatic cylinder 50 suitably mounted on the valve housing structure 41 by means of bolts 51. Disposed within the pneumatic cylinder 51 is a piston 52 which is axially movable therein for shifting a piston rod 53, the latter being rigidly connected to the valve element 48 by means of a threaded terminal connecting element 54.

Means are provided for actuating the pneumatic ram 49 for opening and closing the inlet ports to mixing chamber 42. This actuating means is preferably mounted on the applicator gun 10. Referring again to FIGS. 1 and 2, it will be seen that an air supply conduit 55 is connected to the gun for supplying air thereto and this air supplying conduit 55 is also connected to a suitable source of air under pressure. A pair of conduits 56 and 57 interconnect the gun 10 in fluid communication with the pneumatic ram 49 for causing axial movement of the piston 52. In this connection it will be appreciated that separate supply lines must be utilized with regard to the pneumatic ram 49 since the latter is of the double acting type.

The actuating means for actuating the pneumatic ram 49 includes a valve chamber or recess 58 formed in the pistol grip 12 as best seen in FIG. 1. A hollow tubular plunger 59 is positioned within the valve chamber 58 for axial retraction and extension relative thereto. It will be noted that a pair of valve elements are affixed to the plunger 59 for movement therewith. The valve elements include a front valve element 60 and a rear element 61 each being of substantially identical construction and each having an annular groove formed therein. The valve elements have the peripheral portions positioned in sealing engagement with the wall defining the recess or chamber 58 so that the volume of air disposed on one side of the valve elements cannot escape to the opposite side thereof. It will be noted, however, that the front valve element 60 has a passageway 62 formed therein communicating with the annular groove or channel and also communicating with the hollow interior of the plunger 59. The air valve element 61 is also provided with an air passage 63 which is disposed in communicating relation with the annular recess or groove in the rear valve element and also in communication with the hollow interior of the plunger 59.

It will also be noted that the valve chamber 58 is interconnected to the supply conduit 55 by means of an air passage 85. The valve chamber 58 is interconnected in communicating relation to the conduit 56 by an air passage 86 while the valve chamber is interconnected to the conduit 57 by means of an air passage 87.

Means are provided for shifting the plunger 59 to selectively supply air to the pneumatic ram 49 and this means includes a trigger 64 shiftably mounted on the gun and being disposed in close proximity to the pistol grip 12. Spring means 65 interposed between the pistol grip and the trigger 64 serve to urge the plunger 59 extensibly outwardly. It will be noted that when the trigger 64 is squeezed to axially retract the plunger 59, the valve element 60 will be moved into obstructing relation with respect to air passage 87 while the valve element 63 will be moved out of obstructing relation with respect to the air passage 86. Air supplied into the chamber 58 through an air passage 85 will pass outwardly through the conduit 56 and into the pneumatic cylinder 50 to retract the piston and piston rod and thereby retract the valve element 48. The respective liquid components of the thermo-setting resin system will flow into the blending or mixing chamber 42 and thereafter through the supply conduit 26 to be dispended by the resin dispensing means. It will also be noted that air in the rear portion of the pneumatic cylinder 50 will be forced upwardly through the conduit 57 into air passage 67 and will escape into the hollow plunger 59 through the air passage 62. However, upon release of the trigger 64, the plunger 59 will again be extended to again normally close passage 86 after simultaneously opening air passage 87. Thus, release of the trigger 64 causes closing of the inlet ports 44 and 45 respectively.

Means are also provided for flushing the mixing or blending chamber 42 and the supply conduit to the applicator gun 10 for flushing and removing the residual traces of the thermo-setting resin therefrom. It will be appreciated that if this thermo-setting resin is allowed to cure, the mixing chamber and supply lines along with the liquid dispensing means will become clogged. This means for flushing and removing the thermo-setting residue from the residue chamber and supply lines includes a recess 66 formed in the valve housing structure 41 as best seen in FIG. 6 and which defines a solvent-receiving chamber. This solvent receiving chamber 66 is provided with an inlet port 67, the latter being connected to a solvent supply conduit 68. This solvent supply conduit is connected to a supply of solvent under pressure such as acetone or the like. A discharge passage 69 interconnects the solvent receiving chamber 66 with the mixing or blending chamber 42 and it will be seen that the outlet of this discharge passage defines an inverted frusto conical valve seat 70.

An elongate valve element 71 is positioned for movement within the discharge passage 69 and this valve element 71 has its lowermost end reduced to define an inverted frusto-conical portion 72. It is pointed out that the discharge passage 69 is of greater diameter than the diameter of the valve element or stem 71 while the frusto conical lower end 72 is cut at a different angle than the inverted frusto conical valve seat 70. The valve element 71 is therefore loosely disposed within the discharge passage 69 and it is only when the valve element 71 is forced downwardly that the discharge port at the lower end of the inverted frusto conical valve seat 70 is closed.

The opposite or upper end of the valve element 71 has a piston element 73 affixed thereto and this piston element 73 is positioned for movement within the solvent receiving chamber 66. Referring again to FIG. 6, it will be noted that the piston element and the valve element are illustrated in closing relation with respect to the valve seat 70. In this port-closing position, the piston element 73 has its lowermost surface disposed above the inlet port 67 so that when the solvent is introduced into the solvent receiving chamber 66 through the inlet port 67, the piston element 73 will be forced upwardly by the fluid pressure thus opening the lower end of the discharge passage 69. It is pointed out that the piston element 73 is also of frusto conical configuration so that the lower peripheral portions thereof sealingly engage the wall surfaces defining the solvent receiving chamber 66.

Means are provided for closing the solvent receiving chamber 66 and includes a closure block 74 secured to valve housing structure 41 by means of bolts 75. This closure block 74 has a recess 76 formed therein and coil spring 77 is positioned within the recess and has its lowermost end bearing against the upper surface of the piston element 73. A vent 78 interconnects the spring recess 76 in communicating relation with the exterior. It will, therefore, be seen that the spring 76 normally urges the piston element 73 and the valve element 71 into port-closing relationship.

In this connection, it is pointed out that the valve element 71 and the piston element 73 are also constructed of Teflon material which is resilient and compressible. Thus, only the lower terminal portion of the valve element will be urged into compressed sealing relation with respect to the valve seat 70 while the circumferential marginal portions of the larger end of the piston element 73 will be urged in sealing relation with the inner surfaces of the solvent receiving chamber 66. In the event that any fluid solvents escape around the sealed contact of the piston element 73, this material will be free to flow to the exterior through the vent 78. It will be appreciated that the reduced end portion of the valve element 71 not only sealingly closes the discharge port into the mixing chamber 42 but even when the ports 44 and 45 are opened, the high fluid pressure of the liquid resin components will be insufficient to unseat this lower end portion 72 when the latter is in closed relation to the valve seat 70. This is true because of the relatively small surface area exposed to the high pressure stream of liquid resins as these liquid components flow through the mixing chamber 42. It will also be noted that the lower terminal portion of the valve element 71 will be sealed in almost flush relation with the surfaces defining the mixing chamber 42 so that no recesses are formed for the accumulation of the thermo-setting resin material therein.

Referring now to FIG. 3 and FIG. 4, it will be seen that a different embodiment of my novel applicator gun is there shown. This modified form of my novel applicator gun designated by the reference numeral 10a is constructed similarly to the embodiment illustrated in FIGS. 1 and 2 and includes a pistol grip 12a and a fiber chopping and dispensing mechanism 13a suitably disposed within a housing having a plurality of apertures for receiving therethrough strands of the Fiberglas. Although the various cooperating elements of the chopper mechanism are not shown, it is pointed out that the Fiberglas chopper element and dispensing mechanism are of similar construction to the chopper mechanism 13 disclosed in the embodiments of FIG. 1a. An air motor 21a is provided for driving the cutter roller of this chopper and dispensing mechanism. The applicator gun 10a also includes a resin dispensing means including an elongate tubular resin receiving member 24a having resin dispensing nozzles 25a affixed to opposite ends thereof. A supply conduit 26a interconnects the resin receiving member 24a to the valve blending and metering apparatus 40 in the manner of the embodiment of FIGS. 1 and 2.

However, actuating means are provided for simultaneously actuating the resin dispensing means with the Fiberglas chopping and dispensing mechanism. This means for actuating the resin dispensing means and the Fiberglas chopping and dispensing means includes the pneumatic air supply line 55a which is interconnected to a source of air under pressure and also includes the conduits 56a and 57a which interconnect the metering and blending valve 40 and the valve chamber formed in the pistol grip 12a. It will be noted that the pistol grip is also provided with a plunger 59a of similar construction to the plunger 59 in the embodiment of FIGS. 1 and 2. This valve element works in a similar manner. Thus, when the plunger 59a is axially retracted into the valve chamber, the resin dispensing means is actuated whereby the thermo-setting resin will be discharged through the nozzles 25a. The means for actuating the valve element 59a includes a trigger 64a which is suitably secured to a pin 64b the latter being movable within a recess 64c formed in the pistol grip handle. A spring 64d is positioned within the recess 64c and normally urges the trigger outward. It will be noted that the trigger 64a is secured to the plunger 59a to permit axial retraction of this plunger.

The means for actuating the air motor 21a simultaneously with actuation of the resin dispensing means is also incorporated within the applicator gun 10a. It will be seen that the gun handle is provided with another air supply conduit 90 which is interconnected with a valve chamber 91 by means of a passage 92. This air chamber 91 is also interconnected in fluid communication with a conduit 94 by means of a second air passage 93, the conduit 94 does supply air to the air motor 21a to permit the operation of the latter.

A plunger 95 is also secured to the trigger 64a and is positioned for axial movement within the valve chamber 91. This plunger 95 is provided with a pair of axially or longitudinally spaced apart collars 96 each being disposed in sealing engagement with the inner peripheral wall surfaces of the valve chamber and defining therebetween an annular valve recess. It will be noted that the rear or larger of the annular collars 96 serves as a closure for closing the passage 92 to the air passage 93.

It will be seen that the rearmost of larger annular collars 96 serves as a closure for closing the air passage 92 with respect to the air passage 93. Thus, when the plunger 95 is in position as illustrated in FIG. 3, no air will be supplied to the air motor 21. However, when the air plunger 95 is retracted or moved, rearwardly within the valve chamber 91, the rearmost collar 96 moves out of obstructing sealing relation with respect to the passages 92 and 93 and air will pass around the recess defined between the collars 96 and will pass through the passage 93 into the conduit 94 for actuating the air motor 21.

Thus, it will be seen that means are provided so that dispensing means and the Fiberglas chopper dispensing mechanism will be simultaneously actuated. When the trigger 64a is released the coil spring 64d will urge the pin 64b outwardly along with the plungers 59a and 95 thus simultaneously rendering inoperative the Fiberglas chopping and dispensing mechanism and the liquid resin dispensing means.

In operation, the elongate strands of Fiberglas will be trained between the compression roller and the chopper roller of the chopping and dispensing mechanism and the supply conduit for the liquid resin dispensing means will be connected to the blending and metering valve apparatus 40. If the applicator gun apparatus 10 is used, the trigger 64 and trigger 22 must be depressed simultaneously and the Fiberglas strands will be chopped and dispensed and will be thoroughly and effectively coated with the thermo-setting resin. It is pointed out that the material dispensed through each of the nozzle units 25 will be of homogeneous nature thus permitting the production of high quality Fiberglas reinforced plastic structures. The premixing of the various components greatly increases the quality of the structure thus produced as compared to the applicator systems wherein the various components of the thermo-setting resin systems are mixed after dispensing.

If the modified form of my gun apparatus of FIGS. 3 and 4 is employed, it will be appreciated that the operator merely has to depress the trigger 64a for simultaneously actuating the resin dispensing means and the Fiberglas chopping and dispensing mechanism. It is again pointed out that high quality plastic structures may be obtained through the use of the premixing operation prior to dispensing. In this connection, it will be seen that the dispensing of the premixed or blended resin components minimizes the tendency towards uneven curing of the structure thus formed.

During the blending and metering operation of the valve apparatus 40, the valve element 71 will be disposed in closing relation with respect to the valve seat 70 whereby no resin material may escape into the solvent discharge passage 69. It is pointed out that the cross sectional area of the inlet ports 44 and 45 will determine the amount of material discharged into the mixing chamber 42. Because of the inherent resiliency and compressibility of the Teflon valve elements 48, the inlet ports may be sealed closed at the end of the mixing or blending operation. Furthermore, the thermo setting resin will not at all adhere to the valve element 48. Therefore, as the valve element is extended into the mixing chamber 42 to close the inlet ports 44 and 45 respectively, the sealed contact of the valve element 48 with respect to the inner surfaces defining the mixing chamber 42 will cause all of the resin material positioned forwardly of the valve element to move forwardly thereof. Furthermore, the disposition of the inlet ports in a common vertical plane permits the use of a single valve element for closing and opening the respective ports simultaneously.

At the end of the blending operation, the supply of acetone or other solvent under pressure will be supplied through the inlet port 67. In this connection, it is pointed out that suitable valve means may be provided which will be disposed in flow controlling relation with respect to the solvent supply conduit 68 and will be interposed between the valve apparatus 40 and the source of solvent under pressure. Therefore, when this last mentioned valve means is opened, the solvent will flow through the conduit 68 through the ports 67 and into the solvent receiving chamber 66. The fluid pressure exerted on the underside of the piston element 73 will urge the piston element upwardly against the bias of the spring 77 thereby opening the discharge passage 71 in communicating relation with respect to the mixing chamber 42. The solvent will therefore flow through the mixing chamber and will be supplied to the resin dispensing means and will completely flush the supply conduit, the resin receiving member 24, and the respective nozzle units 25.

From the foregoing it will be seen that a novel applicator gun apparatus and blending valve apparatus has been provided for use in combination therewith which may be advantageously employed in the thermo-setting resin applicator systems.

It will be noted that through the use of this unique valving apparatus and gun apparatus, that higher quality fiber-reinforced plastic structures formed of thermo-setting resins may now be obtained.

It will further be noted that this valve apparatus for blending and premixing the various components of a thermo-setting resin system, such as polyester resin systems or epoxy resin systems, permits the dispensing of a properly blended homogeneous liquid resin.

It will, therefore, be seen that this novel valving and gun apparatus is not only of simple and inexpensive construction, but functions in a more efficient manner than any heretofore known comparable devices.

It will, of course, be understood that various changes may be made in the form, details, arrangement and proportions of the various parts without departing from the general scope of this invention.

What is claimed is:

1. Valve apparatus for metering and blending two or more liquid components of a thermo-setting resin system, said apparatus comprising a valve housing structure having a mixing chamber therewith and having an outlet communicating with said mixing chamber, said housing structure having a plurality of inlet ports communicating with said mixing chamber, a shiftable valve element formed of compressible elastic material positioned within said mixing chamber and extensibly and retractably shiftable relative thereto to open and close said inlet ports, said valve element being of a cross-sectional size greater than the cross-sectional size of the mixing chamber whereby to sealingly close said inlet ports when extended into said mixing chamber and retractable to open said inlet ports, means for shifting said valve element, and means for flushing and removing residual traces of the thermosetting resin from the mixing chamber at the end of the blending or metering operation, said means for flushing comprising a discharge passage communicating with said mixing chamber and a valve mechanism disposed in flow control relationship with respect to said discharge passage movable between passage open and passage closed positions, means resiliently biasing said valve mechanism to passage closed position, and means for flowing solvent under pressure into said passage, means responsive to the pressure of said solvent in said passage effective against said resilient bias means to move said valve mechanism to passage open position.

2. Valve apparatus for metering and blending two or more components of a thermo-setting resin system, said apparatus comprising a valve housing structure having a mixing chamber there within and an outlet communicating with said mixing chamber, said housing structure having a plurality of inlet ports communicating with said mixing chamber, a shiftable valve element formed of compressible elastic material being positioned within said mixing chamber and extensibly and retractably shiftable relative thereto to open and close said inlet ports, said valve element being of a cross-sectional size greater than the cross-sectional size of the mixing chamber and when extended into said mixing chamber sealingly closing said inlet ports thereinto and retractable from said chamber to open said inlet ports, means for shifting said valve element, and means for flushing and removing residual traces of the thermo-setting resin from the mixing chamber at the end of the blending and metering operation, said means for flushing comprising a recess in a portion of said housing defining a substantially closed solvent receiving chamber, a passage interconnecting said solvent receiving chamber and said mixing chamber, a valve element positioned within said interconnecting passage for movement between passage open and passage closed positions, a piston element affixed to said valve element positioned within said solvent receiving chamber for movement therein, said piston element shiftable in response to pressure of liquid flow into said solvent receiving chamber in a direction to shift the valve element to passage open position, and means cooperating with said piston element for normally urging the valve element to passage closed position.

3. Valve apparatus as in claim 2 wherein said piston element is of greater size than said valve element.

4. Valve apparatus as in claim 2 wherein said passage necks down as it enters said mixing chamber and said passage and said valve element are of differing cross-sectional areas.

References Cited by the Examiner
UNITED STATES PATENTS

| | | | |
|---|---|---|---|
| 1,762,611 | 6/30 | Craigon | 239—411 |
| 2,254,123 | 8/41 | Soaper | 239—571 |
| 2,787,314 | 4/57 | Anderson. | |
| 2,933,125 | 4/60 | Anderson | 156—28 |
| 2,975,804 | 3/61 | Dunn et al. | 137—604 |
| 2,995,173 | 8/61 | Nawalanic. | |
| 2,997,055 | 8/61 | Cadonan et al. | 137—240 |
| 3,025,195 | 3/62 | Kozma | 156—38 |
| 3,032,278 | 5/62 | Thomas et al. | |
| 3,049,439 | 8/62 | Coffman | 239—422 XR |

ISADOR WEIL, *Primary Examiner*.

EDWARD J. MICHAEL, *Examiner*.